United States Patent Office 3,159,057
Patented Dec. 1, 1964

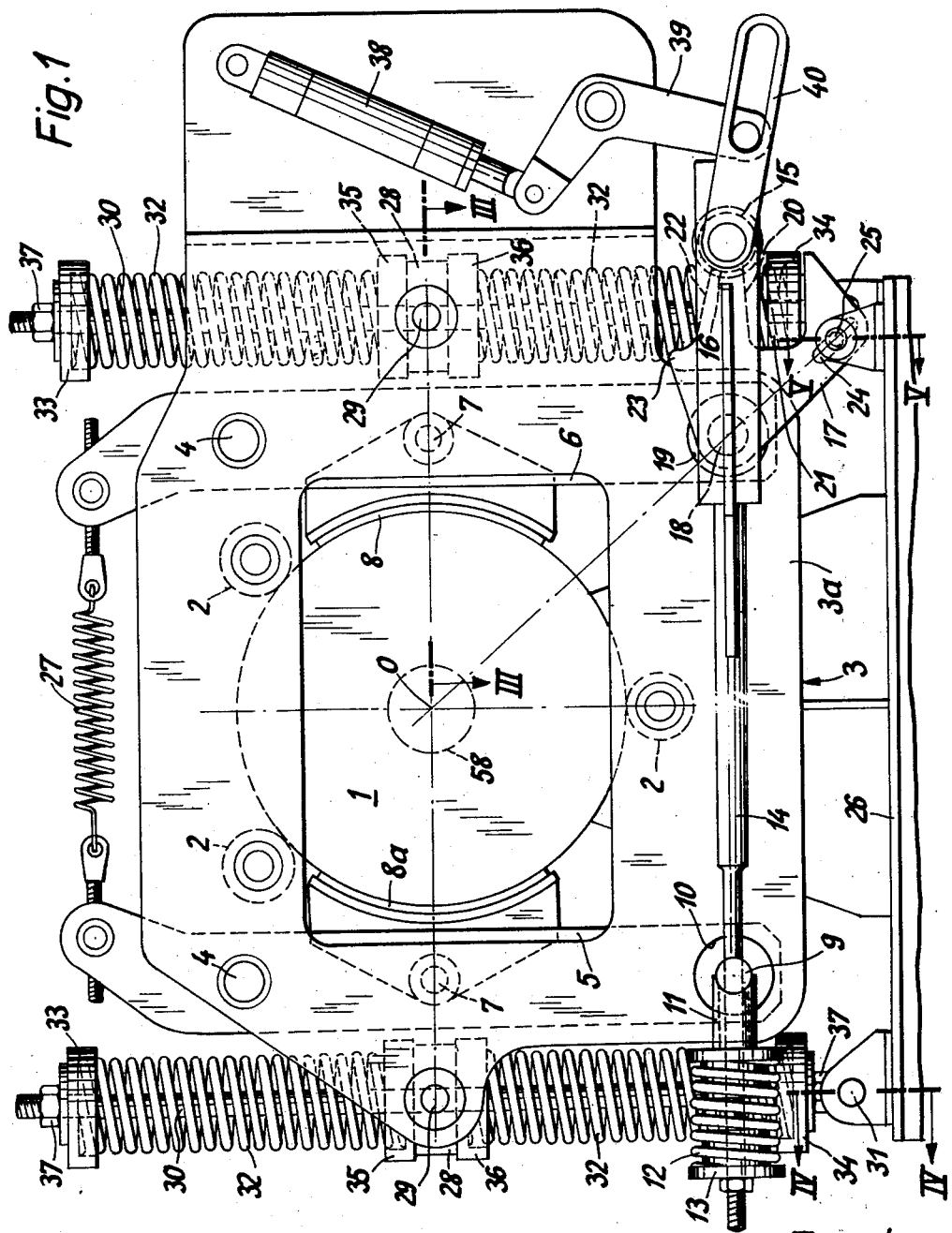

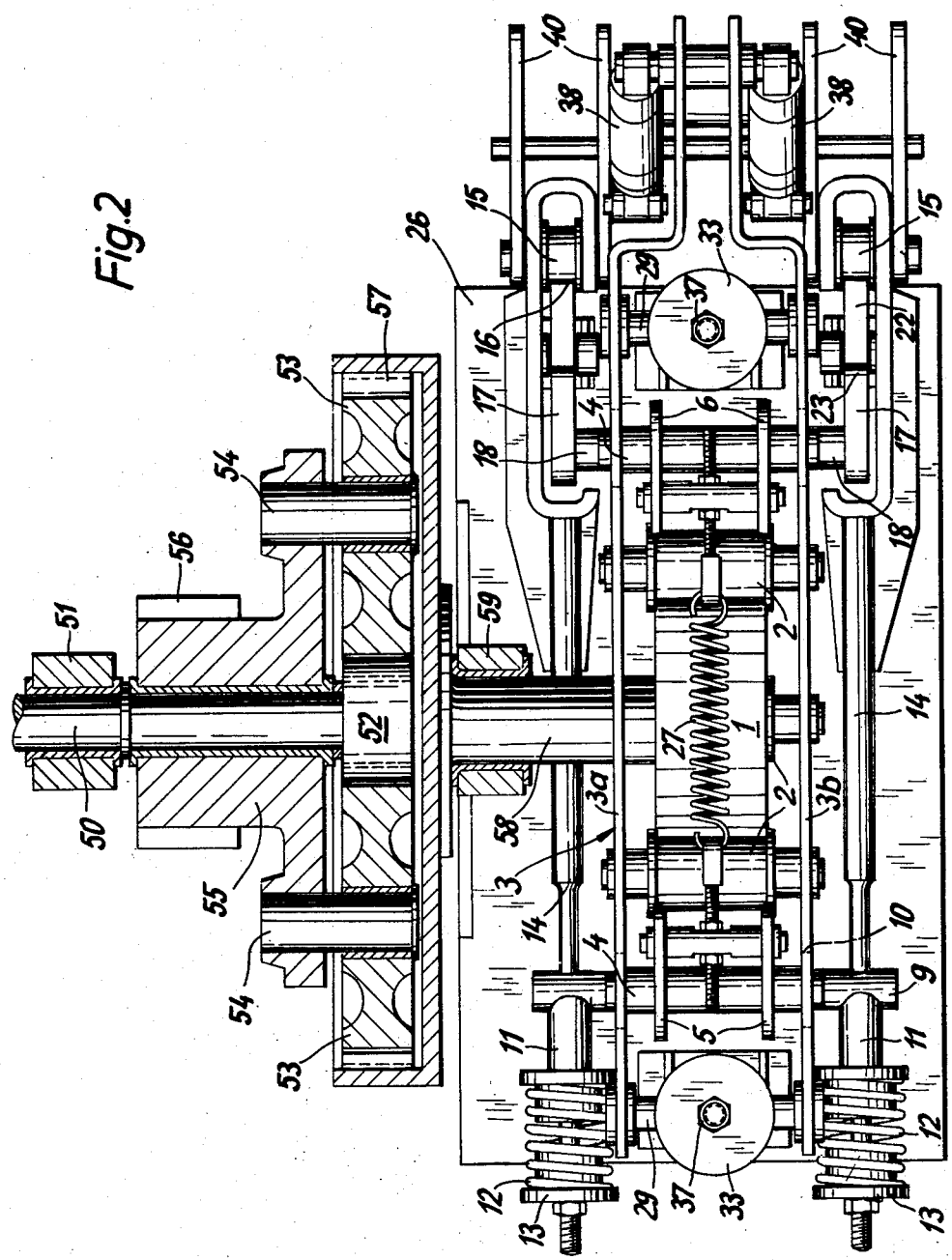

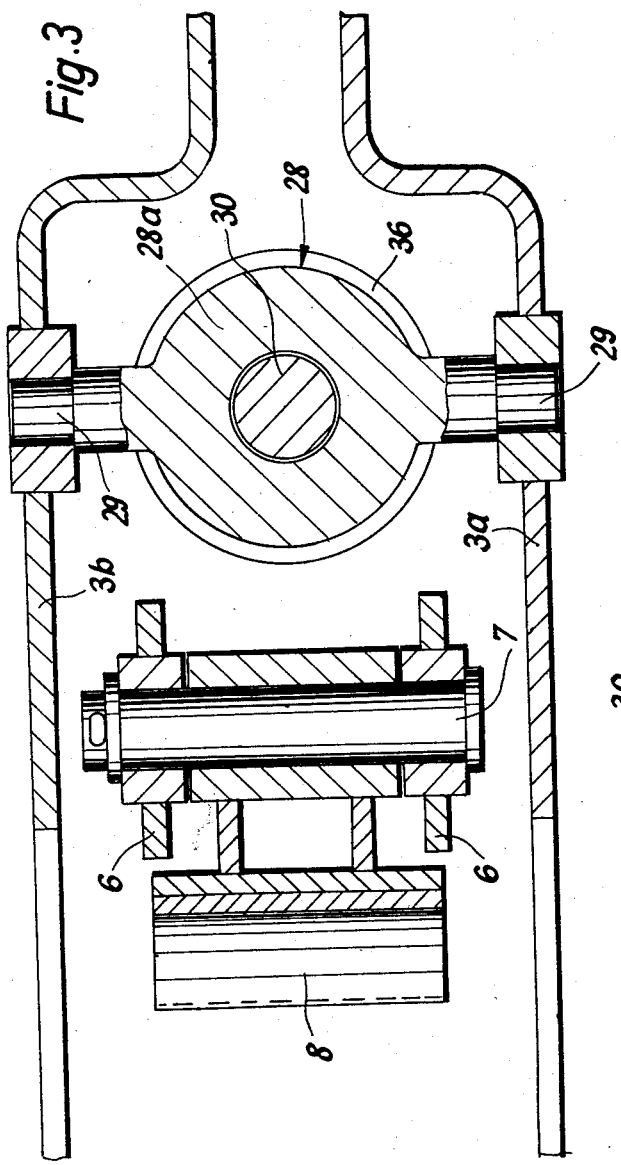
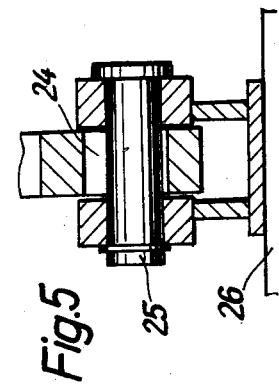
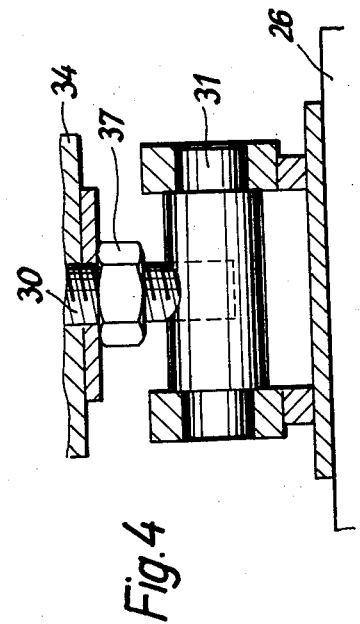

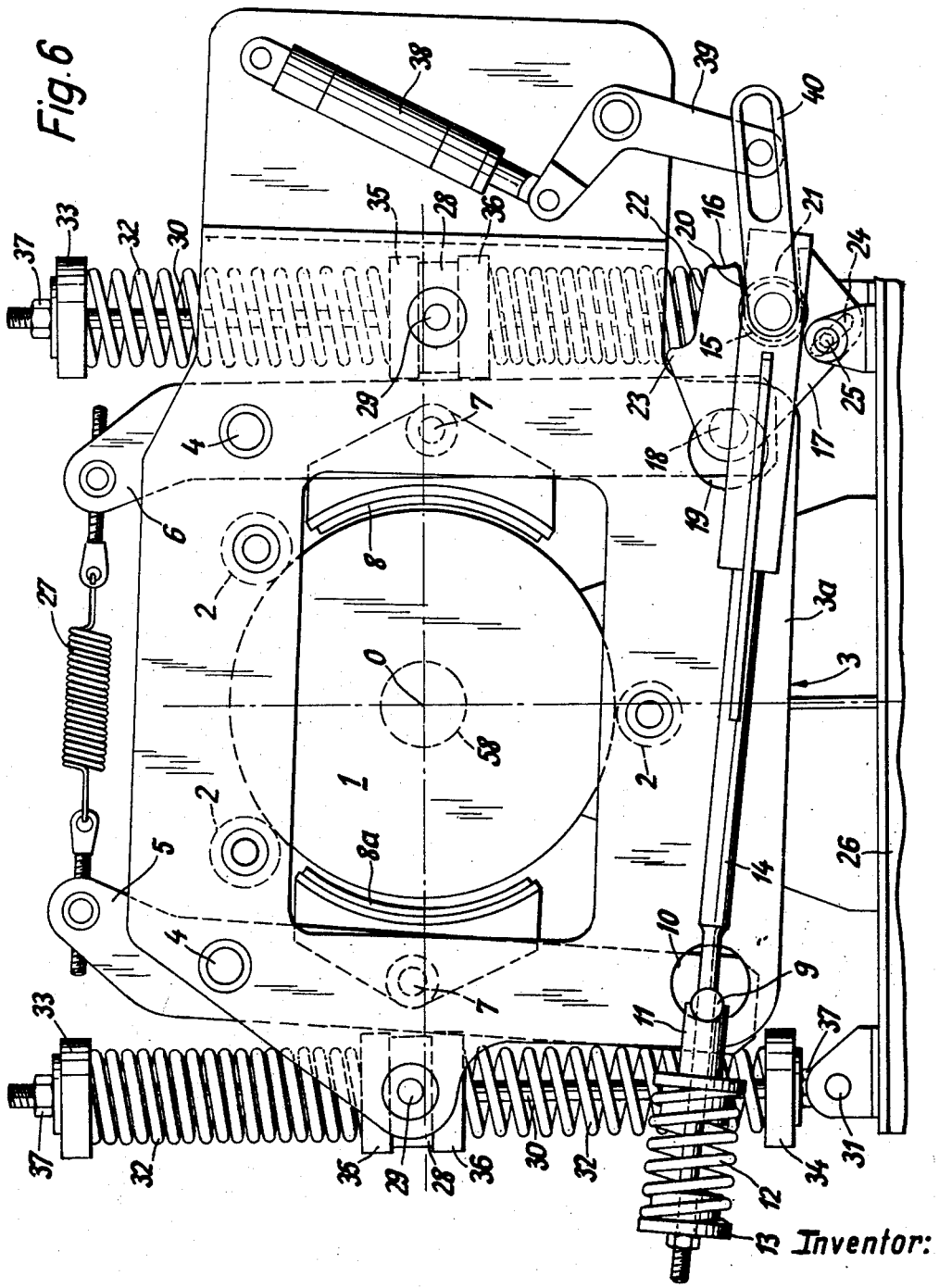

3,159,057
DEVICE FOR PROTECTING DRIVES, ESPECIALLY BUCKET WHEEL DRIVES AGAINST OVERLOADING
Georg Fischer, Rheinhausen, Lower Rhine, Germany, assignor to Beteiligungs-und Patentverwaltungsgesellschaft mit beschrankter Haftung, Essen, Germany
Filed Aug. 1, 1961, Ser. No. 128,569
Claims priority, application Germany, Aug. 4, 1960,
B 58,866
5 Claims. (Cl. 74—785)

The present invention relates to a device for protecting drives, especially bucket wheel drives, from being overloaded.

In connection with drives for bucket wheels it is known to provide a device, as for instance a safety brake, which blocks the ring gear of a planetary gear transmission forming part of a bucket wheel drive for absorbing the torque. With this arrangement, the said ring gear is automatically released when a predetermined driving torque has been obtained so that the planetary gear transmission will be unable any longer to transmit a torque.

With an arrangement of the above mentioned type a construction has been suggested according to which the ring gear may be braked to a follower by means of a brake having a closed power flow. In this arrangement the follower body rests against a support through the intervention of spring elements, while the brake is provided with a release arrangement which at a certain rotation of the follower body is actuated relative to said support. In this connection, the follower body is provided with a unilaterally protruding arm the free end of which rests through the intervention of pre-loaded springs against a transmission housing which forms the said support so that when the ring gear is braked due to the absorption of the torque, additional forces will be transmitted to the bearing for the transmission.

It is, therefore, an object of the present invention to provide a safety arrangement of the above mentioned type, which will overcome the above outlined drawbacks.

It is a further object of this invention to provide a device for protecting drives, especially bucket wheel drives, against overload, in which any occurring overload will not be transmitted to the bearing for the driving means or transmission connected thereto.

These and other objects and advantages of the invention will appear more clearly from the following specification in connection with the accompanying drawings, in which:

FIG. 1 is a side view of a safety device according to the present invention in which the brake forming an essential part of the safety device according to the invention is engaged.

FIG. 2 is a top view of the safety device according to FIG. 1 and shows a horizontal axial section through the planetary gear transmission pertaining thereto.

FIG. 3 is a section taken along the line III—III of FIG. 1 with the brake disc omitted, said section being on a larger scale than that of FIG. 1.

FIG. 4 is a section taken along the line IV—IV of FIG 1.

FIG. 5 represents a section taken along the line V—V of FIG. 1.

FIG. 6 is a diagrammatic side view of a modified safety arrangement according to the invention with the brake in disengaged position.

The safety arrangement according to the present invention is characterized primarily in that the follower body rests through the intervention of springs on a separate support at points which are diametrically oppositely located with regard to the axis of rotation of said follower body. Advantageously, for purposes of actuating the brake, a link system is employed which is journalled on the follower body and comprises a rocker arm support. When the brake is engaged, a pull or pressure member engages the free end of said rocker arm support. Said pull or pressure member exerts upon said rocker arm support a force which loads a spring the line of action of which passes through the tilting axis of said rocker arm support. The said rocker arm support is guided on said separate support in such a way that a rotation of the follower body relative to said separate support brings about a turning of the rocker arm support.

Referring now to the drawings in detail, the arrangement comprises a planetary gear transmission (FIG. 2) having a drive shaft 50 adapted to be drivingly connected to a motor not shown in the drawings. Shaft 50 is journalled in a stationary bearing 51 and carries a sun wheel 52 meshing with planetary gears 53. The said planetary gears 53 are journalled on unilaterally supported studs 54 carried by a planetary gear carrier 55. The planetary gear carrier 55 is rotatably mounted on shaft 50 and has connected thereto a gear 56 adapted to mesh with a gear not shown and pertaining to the transmission for a bucket wheel. The planetary gears 53 mesh with a ring gear or orbit gear 57 which latter through the intervention of a shaft 58 journalled in a stationary bearing 59 is connected to a brake drum 1. Mounted on the cylindrical circumferential surface of brake drum 1 by means of rollers 2 is a frame 3 with walls 3a, 3b. Suspended on said frame 3 between its walls 3a, 3b by means of pivots 4 are two levers 5 and 6 which are equipped with two further studs 7 respectively carrying brake shoes 8, 8a. These brake shoes are provided with friction linings adjacent the circumference of the brake drum 1 and are adapted to engage diametrically oppositely located sections of said brake drum.

Supported by the lower end of lever 5 is a pin or stud 9 extending through corresponding openings 10 in the frame sections 3a and 3b. It should be noted that the openings 10 are considerably wider than the diameter of said stud 9. Sleeves 11 on each side of frame 3, i.e. on the outside of the frame sections 3a and 3b, rest against the outer ends of stud 9. Each of these sleeves is subjected to a thrust of a helical spring 12. That end of said spring 12 which is remote from sleeve 11 rests against a spring plate 13 which is mounted on a rod 14 extending through spring 12, sleeve 11 and stud 9. That end of rod 14 which is remote from spring 12 has journalled thereon a roller 15. When the brake shoes occupy the position shown in FIG. 1, the said roller 15 engages a surface 16 of a pair of members 17 forming a rocker arm support. The members 17 arranged on both sides of frame 3 are tiltable at the ends of a rod 18 which extends with considerable play through circular openings 19 in the two frame sections 3a, 3b and is connected to the lower end of the respective adjacent lever 6.

The surface 16 of each plate or member 17 is provided on a tongue 20 which extends from rod 18 in the direction away from the spring 12. Below the said tongue 20, the plate or member 17 has a cutout 21, whereas the upper side of tongue 20 is provided with a surface 22 which is upwardly inclined in the direction toward the bar or rod 18. Adjacent the said surface 22 there is a step 23 which acts as an abutment for a purpose to be described further below.

The lower portion of each of the two plates 17 has an oblong opening 24 the longitudinal central line of which is directed toward the axis of rod 18. These openings 24 are engaged by studs 25 mounted on a stationary frame 26.

In the position shown in FIG. 1, each of the two plates 17 occupies such a position that the central line of the oblong opening 24 is directed toward the axis O of the brake drum 1. Furthermore, the tongue 20 occupies such a position that the plane containing the axis of roller 15 resting on the surface 16 and also containing the axis of the rod 18, contains the line of action of the force which is exerted by the spring 12 through bar 14 upon the roller 15 and by the latter upon the plate 17. The bar 14 thus occupies a dead center point position when considerable plate 17 and bar 14 as a crank drive.

The two levers 5, 6 are (with regard to FIG. 1) extended upwardly beyond the joints 4 and have their upper ends interconnected by a tension spring 27.

In the position occupied by the arrangement in FIG. 1, the torque exerted during the operation of the planetary gear transmission upon the ring gear 57 connected to the brake drum 1 tends to turn frame 3. This tendency is counteracted by the fact that, in conformity with the present invention, frame 3 is supported through the intervention of springs 32 by the stationary frame 26 at diametrically oppositely located points thereof. To this end, there are provided two followers 28 which are rotatably journalled between the two frame sections 3a, 3b by means of studs 29. Studs 29 are so arranged that their axes are located in the plane which passes through the axis of rotation of brake drum 1 and the axes of studs 7, said studs 29 being evenly spaced from the axis of rotation O. Each of the followers 28 is formed by a sleeve through which extends with play a rod 30. Each of these rods 30 has its lower end tiltably journalled on the stationary frame 26 by means of a stud 31. Above and below each sleeve of follower 28 there is arranged a pressure spring 32 through which extends rod 30. The oppositely located ends of said springs rest against spring cups 33, 34 connected to the upper and lower end respectively of rod 30. Those ends of spring 32 which face each other are by means of spring cups 35, 36 supported by the upper and lower side of the follower 28. The four springs 32 are under a pre-load which may be controlled by means of nuts 37 at the ends of the rods 30.

As long as the torque exerted by the brake drum 1 on frame 3 has not reached such a magnitude that the preload of the springs 32 counteracting this torque is exceeded, frame 3 will retain its position shown in FIG. 1. However, when the torque acting upon frame 3 exceeds a predetermined magnitude which corresponds to the maximum permissible driving torque to be transmitted by the planetary gear transmission, the respective springs 32 are compressed. It may be assumed that the said torque acts in clockwise direction with regard to FIGS. 1 and 6. Consequently, the springs 32 shown in FIGS. 1 and 6 on the righthand side at the bottom and on the left-hand side at the top are compressed and, accordingly, frame 3 is turned in clockwise direction. The plates 17 on both sides of frame 3 are turned in counter-clockwise direction inasmuch as they are guided on the stationary frame 26 by means of studs 25 and oblong openings 24. As a result thereof, the followers 15 roll off from the supporting surface 16 and drop into the cutouts 21 as illustrated in FIG. 6. This brings about a de-tensioning of the springs 12 so that brake shoes 8 will be lifted off from the brake drum by springs 27. Consequently, brake drum 1 and thus the ring gear or reaction member 57 which up to that time formed the torque support for the planetary gear transmission, will be freely rotatable with the result that the planetary gear transmission can no longer transmit a torque.

If the position according to FIG. 1 is to be restored, a hydraulic or pneumatic device is actuated which comprises cylinders 38 arranged an opposite sides of frame 3. By means of the pistons reciprocably mounted in these cylinders, elbow levers 39 journalled on both sides of frame 3 are adapted to be turned in counter-clockwise direction. As a result thereof, through the intervention of fish plates 40, the pull rods 14 are pulled toward the right. This in turn brings about that the springs 12 are again tensioned, and the left-hand brake shoe 8 will engage drum 1. When during this operation, frame 3 has again been brought into its starting position according to FIG. 1, the surfaces 16 of discs 17 will again have moved below the rollers 15. After the device 38 has been made ineffective, the rollers 15 rest upon the surfaces 16 so that also the right-hand brake shoe will rest against the brake drum whereby the position shown in FIG. 1 has been restored.

When the torque exerted upon frame 3 by brake drum 1 acts in counter-clockwise direction, it will be evident that, when the maximum permissible driving torque has been exceeded, the upper right-hand and lower left-hand spring 32 will be compressed, and the discs 17 will be turned in clockwise direction. Consequently, the rollers 15 when rolling off from the surfaces 16, move against the upper surfaces 22 of tongues 20 which likewise brings about a de-tensioning of the springs 12.

It is, of course, to be understood that the present invention is, by no means, limited to the particular construction shown in the drawings but also comprises any modifications within the scope of the appended claims. Thus, instead of being supported by the brake drum, the frame sections 3, 3a may also for instance by supported by a cylindrical surface coaxial to the brake drum and pertaining to the transmission housing.

What I claim is:

1. An overload release mechanism, which includes: an input shaft, power conveying means for driving connection with a drive to be protected against undue overload, a planetary gear transmission interposed between said input shaft and said power conveying means for normally establishing driving connection therebetween, said planetary gear transmission including a rotatable but normally stationary reaction member, and brake drum means, operatively connected thereto, turnable frame means, two lever means spaced from each other in longitudinal direction of said frame means and being pivotally supported thereby, first spring means connecting one end portion of one of said two lever means with the adjacent end portion of the other one of said two lever means and urging said two end portions toward each other, connecting means interconnecting the other two end portions of said two lever means and operable to move into an effective position for holding said other two end portions of said lever means at a minimum spacing from each other against the thrust of said first spring means, said connecting means also being operable to move into an ineffective position to permit said other two end portions of said two lever means to move apart in excess of said minimum spacing by the action of said first spring means, brake shoe means carried by said lever means and operable to engage and disengage said drum means to thereby respectively connect said frame means to and disconnect the same from said reaction member for holding the latter stationary or allowing rotation thereof, said brake shoe means engaging said drum means in response to said connecting means occupying its effective position for braking said reaction member and disengaging said drum means in response to said connecting means occupying its ineffective position for releasing said reaction member, a plurality of second spring means arranged at spaced diametrically oppositely located portions of said frame means and normally counteracting a predetermined permissible maximum torque exerted upon said reaction member through said planetary gear transmission, said connecting means including locking cam means having a locking surface and being pivotally connected to the adjacent one of said other end portions of said lever means and also being pivotally and slidably connected to said stationary supporting means, said connecting means furthermore including bar means with locking means normally engaging said locking area and also including yieldable third spring means normally pressing said locking means against said locking area to thereby hold said cam means in locked condition and the adjacent ends of said lever means at said minimum spacing from each other, said cam means being operable in response to a turning movement of said frame means by a torque exerted upon said frame means in excess of the thrust of said second spring means to move out of said locked condition whereby said third spring means ceases to pull the adjacent end portions of said lever means together and permits said first spring means further to pull the respective adjacent lever means together and to withdraw said brake shoe means from said brake drum means to thereby permit said reaction member freely to rotate relative to said differential transmission.

2. An arrangement according to claim 1, in which said locking cam means is provided with a cutout for receiving said locking means when the latter leaves said locking area.

3. An arrangement according to claim 1, which includes fluid operable means operatively connected to said locking means for moving the latter into engagement with said locking area.

4. An overload release mechanism, which includes: an input shaft, power conveying means for driving connection with a drive to be protected against undue overload, a planetary gear transmission interposed between said input shaft and said power conveying means for normally establishing driving connection therebetween, said planetary gear tranmission including a rotatable but normally stationary reaction member, and brake drum means operatively connected thereto, turnable frame means, bearing means coaxially arranged with regard to said reaction member and turnably supporting said frame means, two lever means spaced from each other in longitudinal direction of said frame means and being pivotally supported thereby while being arranged on opposite sides of said brake drum means, first spring means connecting one end portion of one of said two lever means with the adjacent end portion of the other one of said two lever means and urging said two end portions toward each other, connecting means interconnecting the other two end portions of said two lever means and operable to move into an effective position for holding said other two end portions of said lever means at a minimum spacing from each other against the thrust of said first spring means, said connecting means also being operable to move into an inffective position to permit said other two end portions of said two lever means to move apart in excess of said minimum spacing by the action of said first spring means, brake shoe means carried by said lever means and operable to engage and disengage said drum means to thereby respectively connect said frame means to and disconnect the same from said reaction member for holding the latter stationary or allowing rotation thereof, said brake shoe means engaging said drum means in response to said connecting means occupying its effective position for braking said reaction member and disengaging said drum means in response to said connecting means occupying its inffective position for releasing said reaction member, two pairs of second spring means arranged on opposite sides of said brake drum means, the springs of each pair being spaced from each other and being pivotally connected to said stationary supporting means, a plurality of abutment means respectively interposed between the spring means of each pair of second spring means and engaging the same, said abutment means being supported by portions of said frame means at opposite sides of said brake drum means, said second spring means normally counteracting a predetermined permissible maximum torque exerted upon said reaction member in either direction, said connecting means including locking cam means having a locking surface and being pivotally connected to the adjacent one of said other end portions of said lever means and also being pivotally and slidably connected to said stationary supporting means, said connecting means furthermore including bar means with locking means normally engaging said locking area and also including yieldable third spring means normally pressing said locking means against said locking area to thereby hold said cam means in locked condition and the adjacent ends of said lever means at said minimum spacing from each other, said cam means being operable in response to a turning movement of said frame means by a torque exerted upon said frame means in excess of the thrust of said second spring means to move out of said locked condition whereby said third spring means ceases to pull the adpacent end portions of said lever means together and permits said first spring means further to pull the respective adjacent lever means together and to withdraw said brake shoe means from said brake drum means to thereby permit said reaction member freely to rotate relative to said differential transmission.

5. An arrangement according to claim 4, which includes a plurality of bar means respectively pivotally connected to spaced portions of said stationary supporting means and extending through said pairs of spring means and the abutment means therebetween, and spring dish means arranged at the free ends of said bar means and engaging one end of the adjacent spring means of the respective pair of second spring means.

References Cited in the file of this patent

UNITED STATES PATENTS

| 1,815,345 | Coleman | July 21, 1931 |
| 2,256,154 | Smaltz et al. | Sept. 16, 1941 |

FOREIGN PATENTS

| 512,368 | Italy | Jan. 31, 1955 |